United States Patent
Visweswaran et al.

(10) Patent No.: US 12,425,076 B1
(45) Date of Patent: Sep. 23, 2025

(54) SYSTEM AND METHOD FOR TRANSMITTER FRONT-END CONFIGURATIONS

(71) Applicant: Nokia Solutions and Networks Oy, Espoo (FI)

(72) Inventors: Akshay Visweswaran, Murray Hill, NJ (US); Mustafa Sayginer, Murray Hill, NJ (US); Shahriar Shahramian, Murray Hill, NJ (US); Yves Baeyens, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 19/081,378

(22) Filed: Mar. 17, 2025

(30) Foreign Application Priority Data

Mar. 19, 2024 (FI) .................... 20245318

(51) Int. Cl.
| | | |
|---|---|---|
| H04L 5/12 | (2006.01) | |
| G01S 7/03 | (2006.01) | |
| H04B 7/0426 | (2017.01) | |
| H04B 7/0456 | (2017.01) | |

(52) U.S. Cl.
CPC .............. *H04B 7/0426* (2013.01); *G01S 7/03* (2013.01); *H04B 7/0456* (2013.01)

(58) Field of Classification Search
CPC ........ H04B 7/0426; H04B 7/0456; G01S 7/03
USPC ....................................................... 375/262
See application file for complete search history.

(56) References Cited

U.S. PATENT DOCUMENTS

| | | | |
|---|---|---|---|
| 2012/0146747 A1 | 6/2012 | Wu et al. | |
| 2017/0171012 A1 | 6/2017 | Darwish et al. | |
| 2020/0028499 A1 | 1/2020 | Bellaouar et al. | |
| 2020/0028722 A1 | 1/2020 | Chandrashekar et al. | |
| 2021/0328841 A1 | 10/2021 | Wu et al. | |
| 2022/0229167 A1* | 7/2022 | Loesch | G01S 7/4026 |
| 2022/0329248 A1 | 10/2022 | Azam et al. | |
| 2023/0140391 A1 | 5/2023 | Schossmann et al. | |

FOREIGN PATENT DOCUMENTS

DE 102017208904 A1 11/2018

OTHER PUBLICATIONS

Sun et al., "Analysis and Comparison of MIMO Radar Waveforms", International Radar Conference, Oct. 13-17, 2014, pp. 1-6.
Yi et al., "A 220-to-320-GHz FMCW Radar in 65-nm CMOS Using a Frequency-Comb Architecture", IEEE Journal of Solid-State Circuits, vol. 56, No. 02, Feb. 2021, pp. 327-339.
Kueppers et al., "A Compact 24 × 24 Channel MIMO FMCW Radar System Using a Substrate Integrated Waveguide-Based Reference Distribution Backplane", IEEE Transactions on Microwave Theory and Techniques, vol. 68, No. 06, Jun. 2020, pp. 2124-2133.

(Continued)

*Primary Examiner* — Helene E Tayong
(74) *Attorney, Agent, or Firm* — Nokia Technologies Oy (57) ABSTRACT

A system (200, 300, 400, 500) and method are provided for an implementation of a phase-coded transmitter front-end architecture for a multiple input, multiple output (MIMO) radar system. This architecture achieves broadband operation, supports major power savings, delivers high wireless power, and operates in the near-THz range. Power combining implementations are also provided.

13 Claims, 7 Drawing Sheets

(56) References Cited

OTHER PUBLICATIONS

Durr et al., "High-Resolution 160-GHz Imaging MIMO Radar Using MMICs With On-Chip Frequency Synthesizers", IEEE Transactions on Microwave Theory and Techniques, vol. 67, No. 09, Sep. 2019, pp. 3897-3907.

Merkle et al., "Broadband 240-GHz Radar for Non-Destructive Testing of Composite Materials", IEEE Journal of Solid-State Circuits, vol. 54, No. 09, Sep. 2019, pp. 2388-2401.

Mostajeran et al., "A High-Resolution 220-GHz Ultra-Wideband Fully Integrated ISAR Imaging System", IEEE Transactions on Microwave Theory and Techniques, vol. 67, No. 01, Jan. 2019, pp. 429-442.

Visweswaran et al., "A 28-nm-CMOS Based 145-GHz FMCW Radar: System, Circuits, and Characterization", IEEE Journal of Solid-State Circuits, vol. 56, No. 07, Jul. 2021, pp. 1975-1993.

Beyer et al., "MESFET Distributed Amplifier Design Guidelines", IEEE Transactions on Microwave Theory and Techniques, vol. 32, No. 03, Mar. 1984, pp. 268-275.

Baeyens et al., "High gain-bandwidth differential distributed InP D-HBT driver amplifiers with large (11.3 V/sub pp/) output swing at 40 Gb/s", IEEE Journal of Solid-State Circuits, vol. 39, No. 10, Oct. 2004, pp. 1697-1705.

Lin et al., "A Broadband Balanced Distributed Frequency Doubler With a Sharing Collector Line", IEEE Microwave and Wireless Components Letters, vol. 19, No. 02, Feb. 2009, pp. 110-112.

Abbasi et al., "A D-band Calibration-Free Passive 360° Phase Shifter With 1.2° RMS Phase Error in 45 nm RFSOI", IEEE Radio Frequency Integrated Circuits Symposium (RFIC), Jun. 11-13, 2023, pp. 289-292.

Chien et al., "A D-band, High Switching Speed, Differential Reflection-Type Phase Shifter in 250-nm InP HBT", Proceedings of the 17th European Microwave Integrated Circuits Conference, Sep. 26-27, 2022, pp. 115-118.

Moradinia et al., "A 110-145-GHz SiGe HBT D-Band Vector Modulator Phase Shifter Utilizing Differential Quadrature Delay Lines", IEEE Solid-State Circuits Letters, vol. 06, Apr. 17, 2023, pp. 117-120.

Visweswaran et al., "A 112-142GHz Power Amplifier with Regenerative Reactive Feedback achieving 17dBm peak Psat at 13% PAE", IEEE 45th European Solid State Circuits Conference (ESSCIRC), Sep. 23-26, 2019, pp. 337-340.

Sayginer et al., "A 110-170 GHz Phase-Invariant Variable-Gain Power Amplifier Module with 20-22 dBm Psat and 30 dBm OIP3 Utilizing SiGe HBT RFICs", IEEE Radio Frequency Integrated Circuits Symposium (RFIC), Jun. 11-13, 2023, pp. 305-308.

Zhang et al., "A 124-to-152-GHz Power Amplifier Exploiting Chebyshev-Type Two-Section Wideband and Low-Loss Power-Combining Technique in 28-nm CMOS", IEEE Transactions on Microwave Theory and Techniques, vol. 71, No. 05, May 2023, pp. 1852-1865.

Welp et al., "A Mixed-Mode Beamforming Radar Transmitter MMIC Utilizing Novel Ultrawideband IQ-Generation Techniques in SiGe BiCMOS", IEEE Transactions on Microwave Theory and Techniques, vol. 66, No. 06, Jun. 2018, pp. 2604-2617.

Office action received for corresponding Finnish Patent Application No. 20245318, dated Aug. 13, 2024, 11 pages.

Nguyen et al., "A 6-46 GHZ, High Output Power Distributed Frequency Doubler using Stacked FETs in 0.25 μm GaAs pHEMT", Proceedings of the 11th European Microwave Integrated Circuits Conference, Oct. 3-4, 2016, pp. 381-384.

Office action received for corresponding Finnish Patent Application No. 20245318, dated Jan. 8, 2025, 6 pages.

Extended European Search Report received for corresponding European Patent Application No. 25164277.3, dated Jun. 6, 2025, 10 pages.

* cited by examiner

SYSTEM AND METHOD FOR TRANSMITTER FRONT-END CONFIGURATIONS

RELATED APPLICATION

This application claims benefit of priority from Finnish Patent App. No. 20245318, filed Mar. 19, 2024, the disclosure of which is hereby incorporated in its entirety by reference herein.

TECHNICAL FIELD

The presently described embodiments, in at least one form, relate to transmitter front-end configurations.

BACKGROUND

High-performance sensing applications within the 6G framework require broadband millimeter wave (i.e., mm-wave) and sub-terahertz (i.e., sub-THz) radar systems and other devices. In this regard, as an example, several near-THz radar systems have been demonstrated, but are not effective enough in operation.

As such, it is clear that the current state of the art has deficiencies.

BRIEF DESCRIPTION

In one aspect of the presently described embodiments, a system comprises a signal generator configured to produce phased signals at an input frequency, a distributed doubler core configured to receive the phased signals, at least one processor and at least one memory having instructions stored thereon such that, when executed, the instructions cause the distributed doubler core to process the phased signals to produce a phase-coded output signal at an output frequency, wherein the output frequency is at least twice the input frequency, and, an output transmission line configured to carry the output signal.

In another aspect of the presently described embodiments, the phased signals are quadrature signals at half frequency of the output signal.

In another aspect of the presently described embodiments, the phased signals are differential quadrature signals at half frequency of the output signal.

In another aspect of the presently described embodiments, the signal generator is a hybrid coupler.

In another aspect of the presently described embodiments, pre-driver stages are provided to the distributed doubler core, each pre-driver stage being tuned to a different center frequency.

In another aspect of the presently described embodiments, the distributed doubler core comprises a plurality of unified doubler cores.

In another aspect of the presently described embodiments, a plurality of pre-driver stages are provided, each pre-driver stage corresponding to one of the plurality of unified doubler cores and being tuned to a different center frequency.

In another aspect of the presently described embodiments, the system is implemented in a front-end for a near-THz multiple input, multiple output radar system.

In one aspect of the presently described embodiments, a method comprises producing phased signals at an input frequency by a signal generator, receiving the phased signals at a distributed doubler core, processing the phased signals to produce a phase-coded output signal at an output frequency, wherein the output frequency is at least twice the input frequency, and, carrying the output signal on an output transmission line.

In another aspect of the presently described embodiments, the phased signals are quadrature signals at half frequency of the output signal.

In another aspect of the presently described embodiments, the phased signals are differential quadrature signals at half frequency of the output signal.

In another aspect of the presently described embodiments, the signal generator is a hybrid coupler.

In another aspect of the presently described embodiments, pre-driver stages are provided to the distributed doubler core, each pre-driver stage being tuned to a different center frequency.

In another aspect of the presently described embodiments, the distributed doubler core comprises a plurality of unified doubler cores.

In another aspect of the presently described embodiments, a plurality of pre-driver stages are provided to the distributed doubler core, each pre-driver stage corresponding to one of the plurality of doubler cores and being tuned to a different center frequency.

In another aspect of the presently described embodiments, the method is implemented in a front-end for a near-THz multiple input, multiple output radar system.

In another aspect of the presently described embodiments, a system comprises an input line configured to provide input signals for power generation, an output line, a power splitter configured to receive the input signals and enable power combining on the output line, and, a distributed double core configured to generate and output on the output line a single-ended output signal based on the input signals.

In another aspect of the presently described embodiments, the system further comprises pre-driver stages provided to the distributed double core, each pre-driver stage being tuned to a different center frequency.

In another aspect of the presently described embodiments, a method comprises receiving input signals for power generation at a power splitter, enabling, by the power splitter, power combining an output line, and generating, by a distributed doubler, a single-ended output signal based on the input signals, and, outputting the single-ended output signal on an output line.

In another aspect of the presently described embodiments, the distributed doubler utilizes pre-driver stages, each pre-driver stage being transmitted to a different center frequency.

DETAILED DESCRIPTION

As noted, current transmitter configurations could be improved. For example, phase-coded or code-domain multiple-input multiple-output (MIMO) radar systems offer high spatial resolution while improving image quality and operating range through simultaneous transmission and reception from all elements of the antenna array. However, several known near-THz radar systems do not effectively use phase-coded MIMO operation. This is due to both architectural and circuit-level limitations. Also, a code-domain MIMO radar system at 145-GHz (gigahertz) has been presented, but the odd frequency multiplication factor used in the transmit chain is inherently power-inefficient at higher frequencies.

According to the presently described embodiments, in at least one form, a phase-coded transmitter front-end architecture for MIMO radars is implemented. This architecture has many advantages. For example, in at least one form, it achieves broadband operation, supports major power savings, delivers high wireless power, and pushes the envelope of operating frequencies in modern integrated circuit (IC) technologies by operating in the near-THz range. As a further example, in at least one form, the system unifies individual sub-tasks of frequency multiplication, power amplification, and phase-coding to thereby reduce complexity and foster sub-THz operation.

Figure 1:
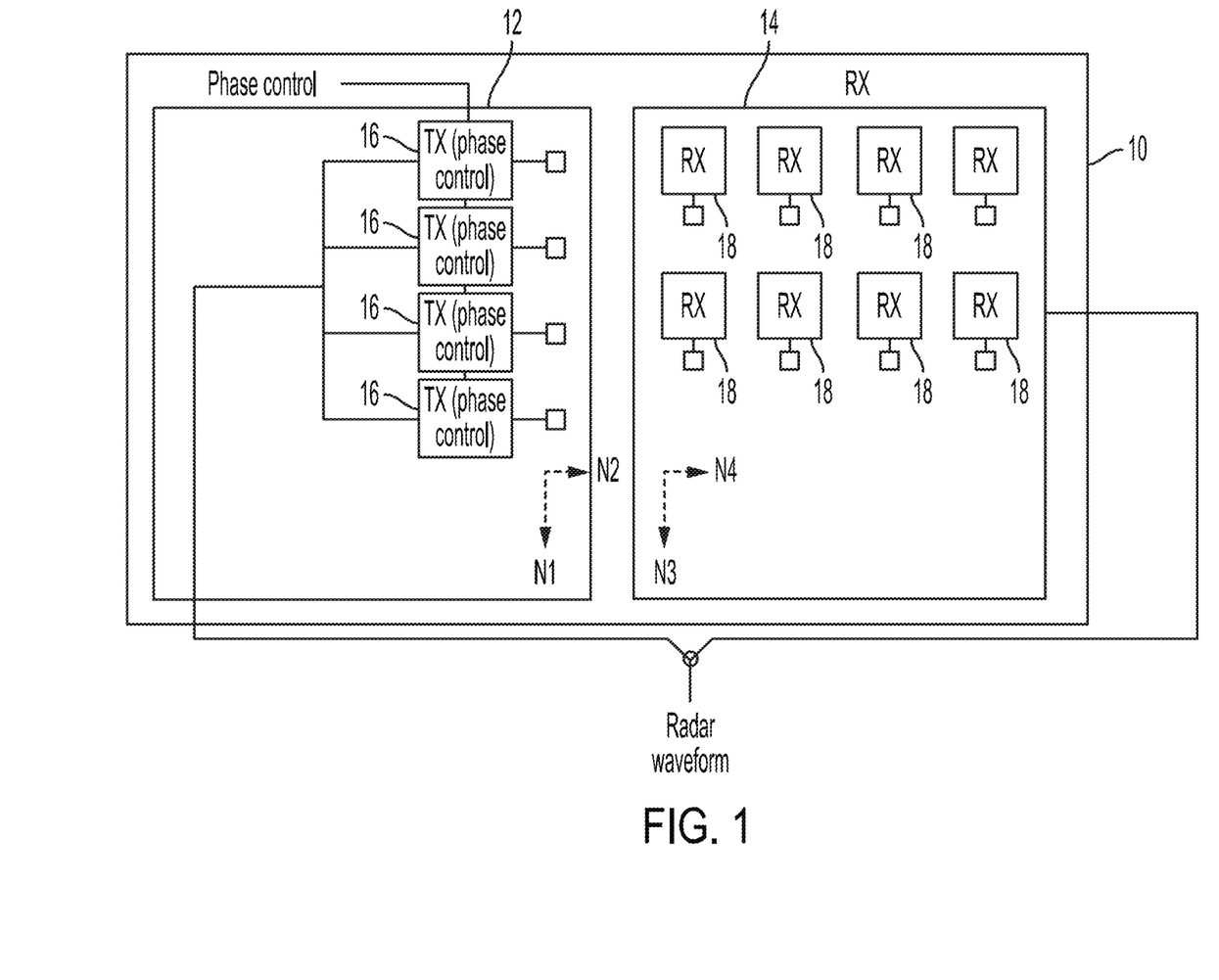
FIG. 1 is a representative block diagram of a MIMO radar system.

FIG. 1 shows a typical MIMO radar system 10 of generic array size having a transmitter side 12 and a receiver side 14, with phase-coding required in the transmitter (TX) side 12, wherein the output switches between 0 to 180 degrees in phase for beam patterning. As shown, the system comprises two-dimensional (2-D) arrays on the transmitter (TX) side 12 and receiver (RX) side 14. The transmitter side 12, as shown, includes an array of four (4) transmitters 16. The receiver side 14 includes an array of eight (8) receivers 18. In this system, phase control is used to swap the phase between 0 and 180 degrees required, for example, using Hadamard coded MIMO sequences. In the example shown, phase control is provided for each transmitter 16 from a processor or control unit—that could be integral or associated with the radar system.

According to the presently described embodiments, in at least one form, an architecture is implemented that seamlessly combines phase-coding and frequency-multiplication functionalities into a unified transmitter (TX) block in a non-intrusive manner. One example embodiment generates improved output power at near-THz frequencies. Notably, in at least one form of the presently described embodiments, an implementation of a phase-coded transmitter front-end architecture for MIMO radars is achieved, which operates in broadband, delivers high output power, and is amenable to high-frequency operation. The functionality of phase coding is embedded into the frequency multiplication path, using a previously unknown quadrature-phased distributed doubler core, which serves additionally as the antenna driver at the TX front end.

Frequency doublers and distributed multipliers are known. However, the utilization of quadrature paths along distributed doubler cores to achieve phase coding at their combined output (e.g., in at least one case, over a common output load) has not been heretofore known. In at least one form, digital on-off control in the in-phase/quadrature (I/Q) path achieves the phase coding necessary for MIMO operation at the output frequency, which is twice the input frequency.

Advantages include, for example, that systems implemented according to the presently described embodiments support broadband operation, circumvent lossy switch networks and power combining techniques utilized in phase modulators, and are an elegant solution that improves both power efficiency and performance of, for example, the radar system.

In at least one implementation, examples of which will be described in connection with, for example, FIGS. 2-6 and 8 below, a system according to the presently described embodiments may be implemented in a front-end for a near-THz multiple input, multiple output radar system. Example systems according to the presently described embodiments may comprise a signal generator configured to produce phased signals at an input frequency. The phased signals are, in at least one form, quadrature signals. In at least one other form, the phased signals are differential quadrature signals. In at least one form, the signal generator is a hybrid coupler. The example system(s) also includes a distributed doubler core configured to receive the phased signals. The distributed doubler core may, in at least one form, comprise a plurality of unified doubler cores. Also, the distributed doubler, in at least one example, is controlled by at least one processor and at least one memory having instructions stored thereon such that, when executed, the instructions cause the distributed doubler core to process the phased signals to produce a phase-coded output signal at an output frequency. In at least one form, the output frequency is at least twice the input frequency, and the output transmission line is configured to carry the output signal.

Moreover, in at least one embodiment, at the level of circuit implementation, frequency-weighting is implemented in pre-amplification in the distributed doubler for improvement in circuit performance. In this regard, for example, the system may comprise pre-driver stages provided to the distributed doubler core, each pre-driver stage being tuned to a different center frequency. In addition, each pre-driver stage may correspond to one of the plurality of unified doubler cores (where applicable) and be tuned to a different center frequency.

Figure 2:
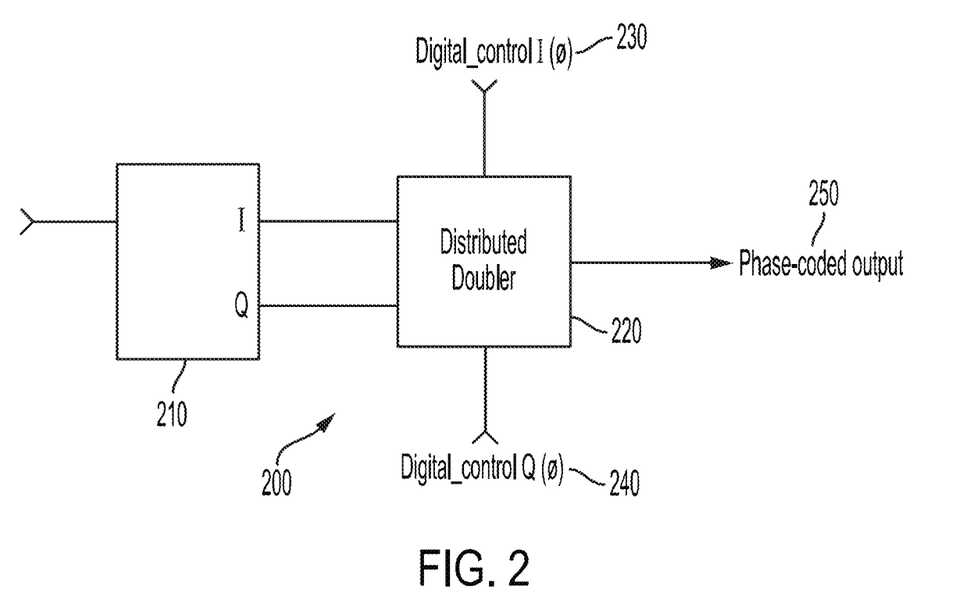
FIG. 2 illustrates an implementation according to the presently described embodiments.

With reference now to FIG. 2, a block diagram of an example embodiment according to the presently described embodiments is set forth. FIG. 2 shows quadrature signals driving a doubler core with a single output, with digital control in the I and Q paths accomplishing 0-180 degrees phase-coding at the output. That is, in FIG. 2, a transmitter RF-front end 200 comprises a 90-degree hybrid coupler 210 used to generate 0 and 90 degree (I/Q) phased signals at an input frequency. The coupler 210 feeds I and Q signals to a distributed doubler core 220 with digital control 230, 240 on the I/Q paths, respectively, for phase-coding (e.g., alternating options between 0 and 180 degrees) at the output 250, which output could take a variety of forms including as examples, in at least one form, a phase-coded output, which may be single-ended or differential in nature. In this example, the output frequency is twice the input frequency.

Figure 3:
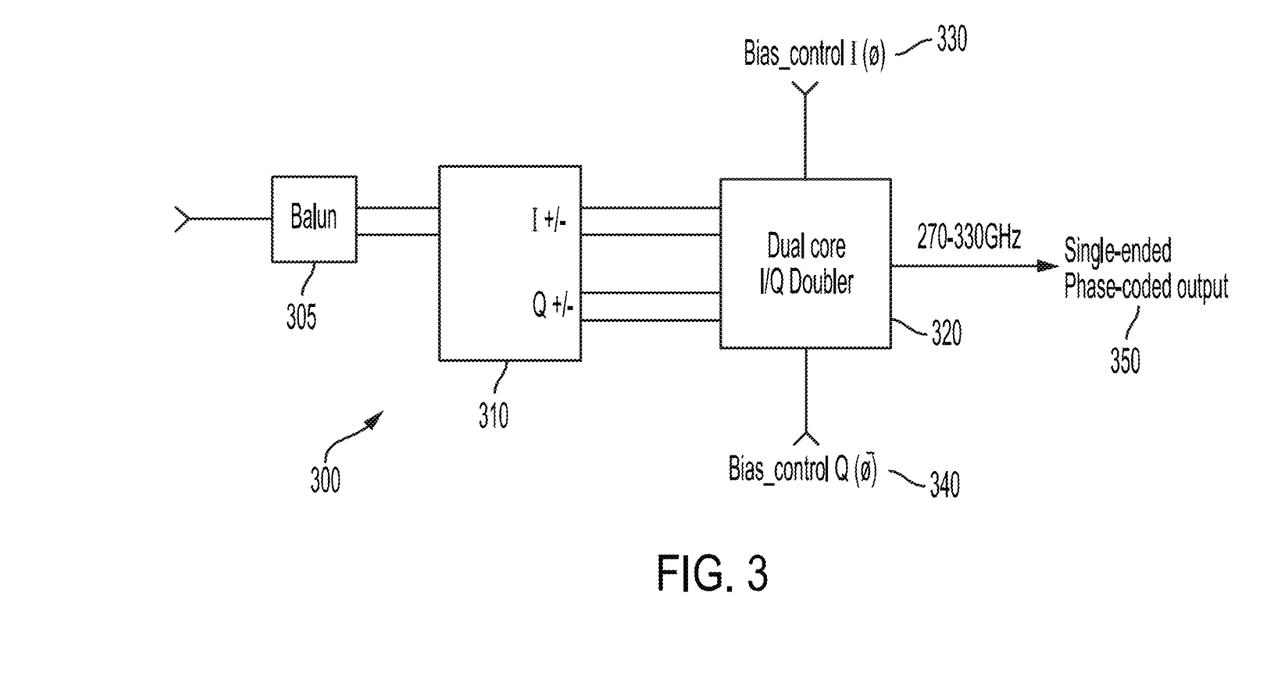
FIG. 3 illustrates an implementation according to the presently described embodiments.

A differentially driven implementation is shown in FIG. 3. In this regard, FIG. 3 shows differential quadrature signals driving an I/Q doubler core with a single output, with digital control in the I and Q paths accomplishing 0-180 degrees phase coding. A distinguishing feature is the architecture itself, which simplifies and combines the three aspects of phase-coding, frequency multiplication, and signal power generation at near-THz frequencies.

As shown in FIG. 3, a front-end 300 includes a dual doubler core 320. As noted, the dual doubler core 320 receives input differential quadrature signals from a hybrid coupler 310. The coupler 310 is associated with a balancing unit or balun device 305 to balance the signal. Digital control 330, 340, e.g., bias control, is provided to the front-end 300 to ultimately contribute to providing an output 350 from the doubler core 320. In at least one example, as shown, the output has a frequency in a range of 270-330 GHZ.

Figure 4:
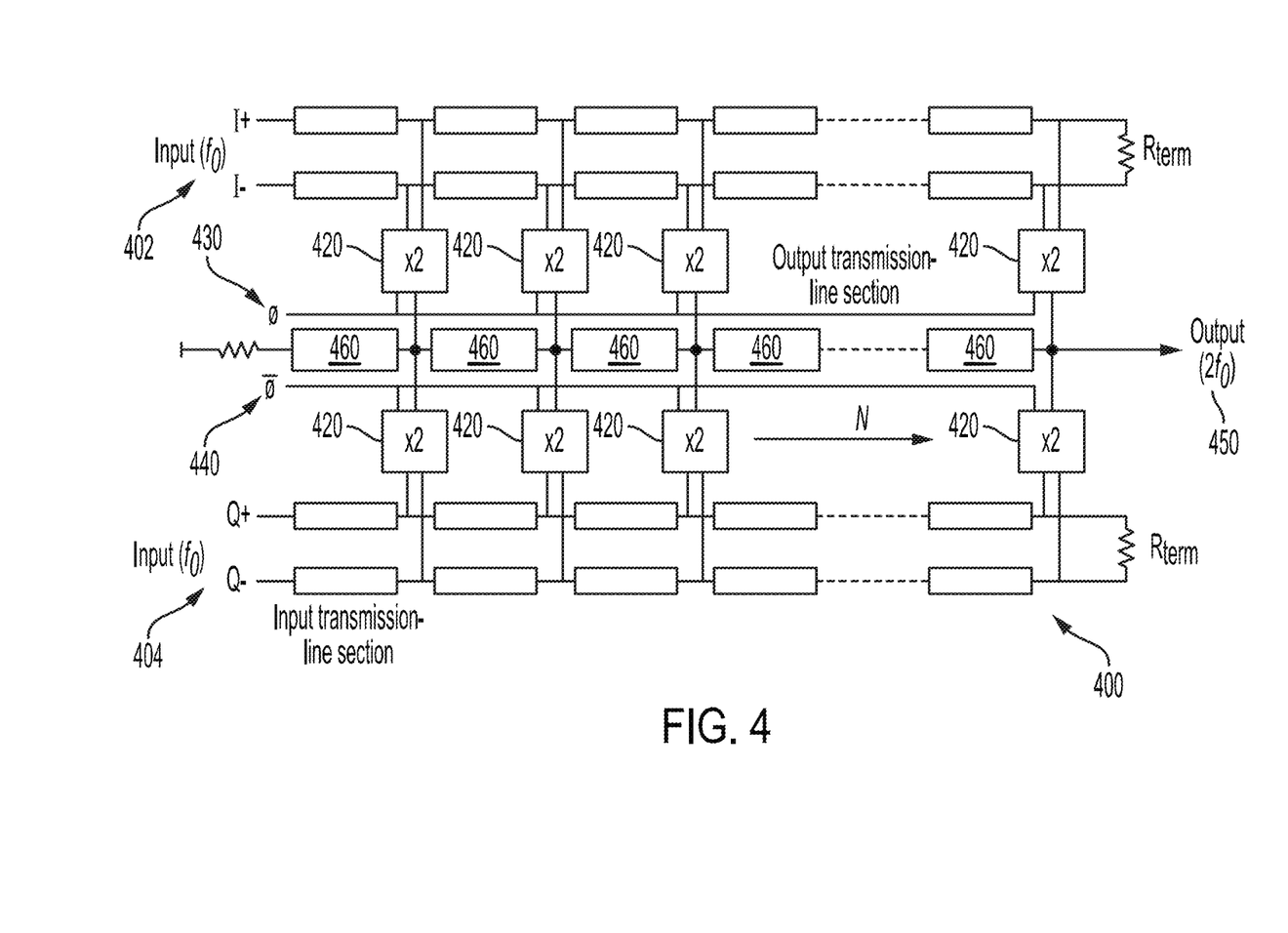
FIG. 4 illustrates an implementation according to the presently described embodiments.

FIG. 4 illustrates another example implementation 400 showing unified distributed doublers 420 in the I/Q paths 402, 404, driving a common, output transmission-line load 460. Digital control 430, 440 on the core bias (φ and its complement) enables 0-180 degree phase coding for MIMO operation. In this regard, an elaboration of the doubler implementation 400 is shown wherein multiple doubler cells 420 (N in the figure) tap into the input transmission lines 402, 404 carrying the quadrature phased input signals, and the outputs of these doubler cells are tied to a common output transmission line 460. The doubler cell 420 itself may comprise any non-linear element, that produces harmonics of the input frequency at its output. Phase coding is accomplished using complementary signals φ and its complement, which swap the I and Q signal paths, resulting in a phase-swap of 180-degrees at the output 450.

As described above, these implementations according to the presently described embodiments have the advantages of, for example, broadband operation, delivery of high output power, and useful for high-frequency operation.

In addition to the above examples of the presently described embodiments implementing phase-coded transmit front-end architectures, further variations may be implemented, for example, at circuit level to enhance the performance of the distributed doubler.

Figure 5:
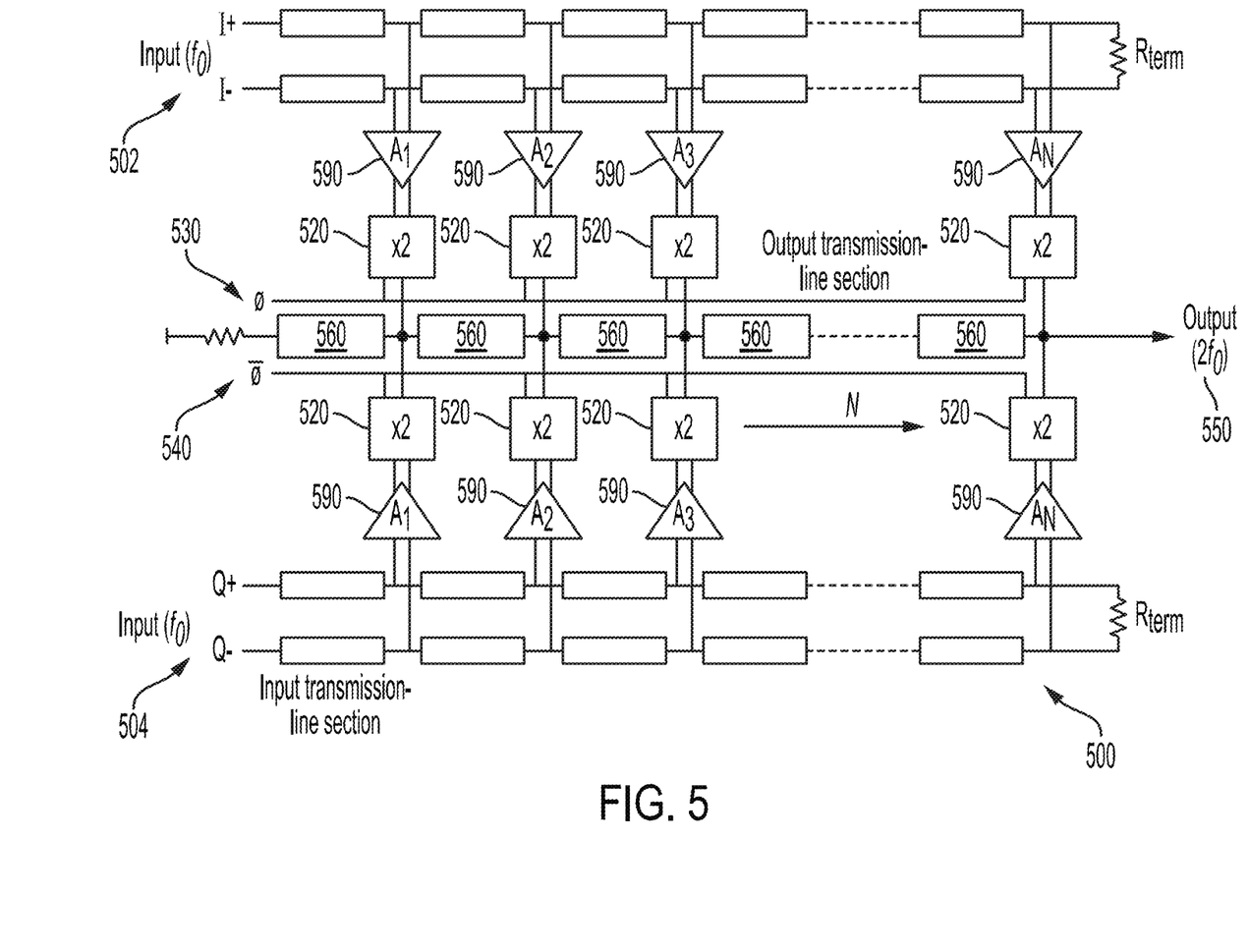
FIG. 5 illustrates an implementation according to the presently described embodiments.

In this regard, for example, FIG. 5 shows an implementation 500 with unified distributed doublers 520 in the I/Q paths 502, 504, with a modification of weighted pre-drivers μl to AN 590, tuned to different center frequencies. FIG. 5 shows pre-driver stages 590 attached to each doubler core 520. Also shown in FIG. 5 are digital control 530, 540 used to control the system or implemented 520 to produce an output 550 that is carried on output transmission line 560.

In this example, the pre-drivers 590 are tuned to different center frequencies. As such, efficiency of the pre-driver stages 590 is maximized at narrowband frequencies, while the power-summation across multiple stages yields high output power, over a broad bandwidth at increased efficiency.

Figure 6:
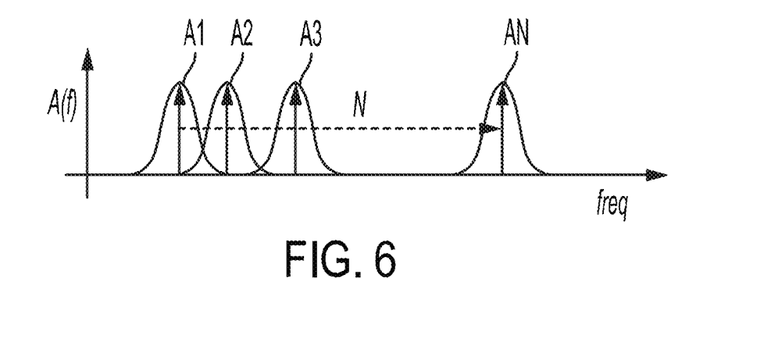
FIG. 6 is a graph showing an output of an example implementation according to the presently described embodiments.

In this regard, FIG. 6 illustrates the frequency response of individual amplifier stage μl to AN, e.g., the frequency response of individual pre-driver stages. The distributed structure with selectively tuned preamplifiers, as well as the improvements in performance have not been reported before. As shown, each pre-driver produces a local narrow-band signal which, when summed, cover the broadband spectrum of the distributed double core that is implemented.

Figure 7:
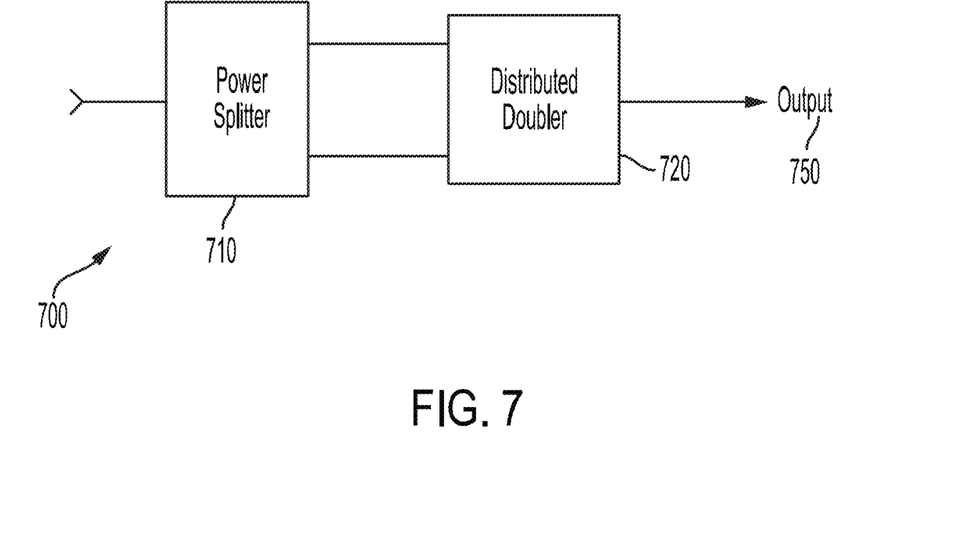
FIG. 7 illustrates an implementation according to the presently described embodiments; and, FIG. 8 illustrates an implementation according to the presently described embodiments.

Further, according to the presently described embodiments, in at least one form, as another example, a system will be described in connection with FIG. 7 (and FIG. 8). FIG. 7 shows an implementation 700 that achieves power combining at outputs of the dual-core distributed doubler path 720 to maximize drive capability. That is, replacing the hybrid coupler, such as hybrid coupler 210 of FIG. 2, with a power splitter 710 enables power combining of signals generated by individual distributed doublers on a common output T-line 750. This technique of power combining is not limited to the use in radar systems and solves a larger circuit-level bottleneck of power generation at THz frequencies as well. Traditionally, power combining is accomplished with an explicit power combining network at the output. These may be transformers, combiners or hybrids, and as a downside, these auxiliary networks introduce loss and bandwidth limitation. In this arrangement 700, the capacitive loading from individual cores of the distributed doubler 720 gets absorbed in the transmission line at the output 750, resulting in merely alteration of the characteristic impedance of the transmission line itself, with no loss in power or bandwidth.

That is, in at least one form, the system 700 comprises an input line configured to provide input signals for power generation, an output line, a power splitter configured to receive the input signals and enable power combining on the output line, and, a distributed doubler core configured to generate and output on the output line a single-ended output signal based on the input signals. Also, in at least one example, the system 700 further comprises pre-driver stages provided to the distributed double core, each pre-driver stage being tuned to a different center frequency.

It will be appreciated that methods according to the presently described embodiments may be implemented. In one example, the method(s) is implemented in a front-end for a near-THz multiple input, multiple output radar system.

In at least one form, the method comprises producing phased signals at an input frequency by a signal generator. The phased signals are, in at least one form, quadrature signals. In at least one other form, the phased signals are differential quadrature signals. Also, in at least one form, the phased signals are produced by a signal generator taking the form of a hybrid coupler.

The example method(s) includes receiving the phased signals. In at least one form, this receipt occurs at a distributed doubler core which, in at least one form, comprise a plurality of unified doubler cores. According to these examples of the method, the phased signals are processed to produce a phase-coded output signal at an output frequency, wherein the output frequency is at least twice the input frequency. In at least one form, the output signal is carried on an output transmission line.

The system 700 may also be operated in a variety of methods according to the presently described embodiments. In at least one form, the method comprises receiving input signals for power generation at a power splitter, enabling, by the power splitter, power combining an output line, and generating, by a distributed doubler, a single-ended output signal based on the input signals, and, outputting the single-ended output signal on an output line.

As with the examples of system implementations shown in, for example, FIGS. 2-5 and 7, the method(s) according to the presently described embodiments, in at least one embodiment, at the level of circuit implementation, frequency-weighting is implemented in pre-amplification in the distributed doubler for improvement in circuit performance. In this regard, for example, the system may comprise pre-driver stages provided to the distributed doubler core, each pre-driver stage being tuned to a different center frequency. In addition, each pre-driver stage may correspond to one of the plurality of unified doubler cores (where applicable) and be tuned to a different center frequency.

Figure 8:
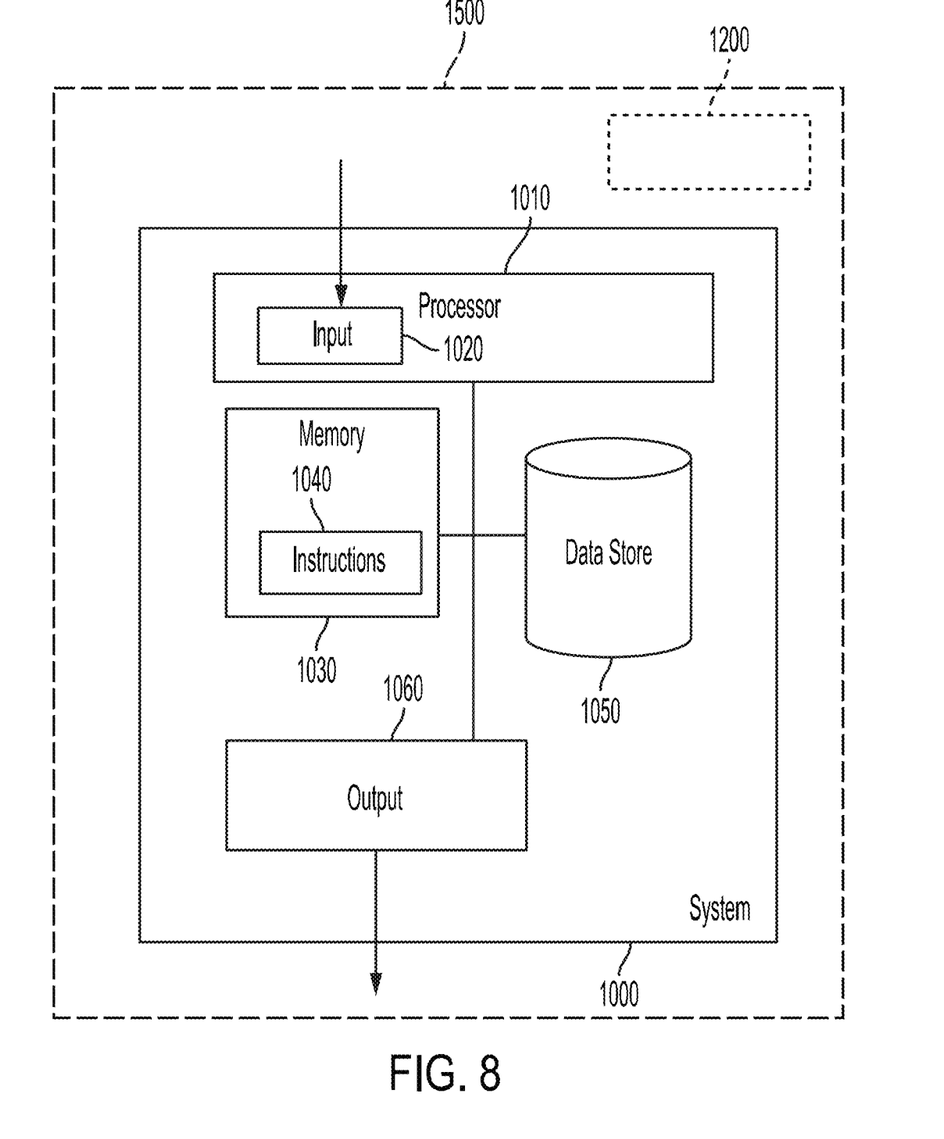

With reference now to FIG. 8, a system 1000 is shown. It should be appreciated that the system 1000 may take a variety of forms and be implemented in a variety of environments. For example, the system 1000 may be implemented in a suitable network element 1500 in a communications network to provide a suitable function in accord with the presently described embodiments. In this regard, the network element 1500 may take a variety of forms. In any suitable form, the network element may also be provided with an antenna or antenna system 1200 having, for example, antenna ports and other suitable features.

The system 1000 is provided with appropriate control and processing capability. The system 1000 may be implemented to provide processing and/or control to the systems and methods described herein, including in connection with FIGS. 2-5 and 7 herein, as those of skill in the art will appreciate. In one form, the system 1000 includes a processor or controller 1010 to control, among other functions and hardware, the front-end and radar function according to the presently described embodiments. The processor includes an input unit 1020 to receive data and information. Of course, a memory unit 1030, or several memory units, are included in the system 1000. In this regard, the presently described embodiments, in at least one example, include suitable software program(s) (e.g., instructions and/or code 1040 which are stored on the at least one memory 1030) which, when executed by at least one processor, cause the processor and/or associated elements of the system to implement the method(s) according to the presently described embodiments. The system 1000 also includes a data storage unit 1050 and an output unit 1060.

It will be appreciated that the memory unit 1030 and data storage unit 1050 may take a variety of suitable forms to implement the presently described embodiments that will be apparent to those skilled in the art, including non-transitory computer readable media. The memory unit 1030 and data storage unit 1050 may be separate elements, combined elements or appropriately distributed, depending on the application. These units 1030 and 1050 may also be provided integrally with processor 1010 (or other processing elements) or fabricated and/or maintained separately therefrom.

Also, it will be appreciated that the structures and procedures shown above are only a representative example of embodiments that can be used to facilitate embodiments described above. In this regard, the various embodiments described in the examples above may be implemented using any suitable circuitry, hardware, and/or software modules that interact to provide particular results. One of skill in the computing arts can readily implement such described functionality, either at a modular level or as a whole, using knowledge generally known in the art. For example, the methods described herein may be used to create computer-readable instructions/code for execution by a processor. Such instructions may be stored on a non-transitory computer-readable medium and transferred to, for example, the processor for execution as is known in the art.

In this regard, it should be appreciated that the processor and/or controller 1010 is merely an example—it may take a variety of forms. For example, the above-described methods and/or techniques can be implemented on a system using well-known computer processors, memory units, storage devices, computer software, and other components. As shown in the example representation of such a system, the system 1000 includes at least one processor 1010 which receives data at an input module 1020 and controls the overall operation of the system 1000 by executing computer program instructions which define such operation. The computer program instructions may be stored in at least one storage device or memory 1030 (e.g., a magnetic disk or any other suitable non-transitory computer readable medium or memory device) and loaded into another memory (not shown) (e.g., a magnetic disk or any other suitable non-transitory computer readable medium or memory device), or another segment of memory 1030, when execution of the computer program instructions is desired. Thus, the methods described herein may be defined by the computer program instructions 1040 stored in the memory 1030 and controlled by the processor 1010 executing the computer program instructions 1040.

Also, according to various embodiments, FIG. 8 is an example representation of possible components of a system including a processor for illustrative purposes. Of course, the system may include other components. Also, the system 1000 is illustrated as primarily a single device or system. However, the system 1000 may be implemented as more than one device or system and, in some forms, may be a modular or distributed system with components or functions suitably distributed in, for example, a network or in various locations.

The presently described embodiments have been described with reference to examples of various implementations. It is appreciated that modifications and alterations will occur to others upon reading and understanding the preceding detailed description. It is intended that the presently described embodiments be construed as including all such modifications and alterations insofar as they come within the scope of the appended claims or the equivalents thereof.

The invention claimed is:

1. A system comprising:
    a signal generator configured to produce phased signals at an input frequency;
    a distributed doubler core comprising a plurality of unified doubler cores coupled to a plurality of input transmission lines to receive the phased signals and coupled to a common output transmission line;
    at least one processor and at least one memory having instructions stored thereon such that, when executed, the instructions cause the plurality of unified doubler cores of the distributed doubler core to process the phased signals to produce, using complimentary bias control signals, a phase-coded output signal at an output frequency, wherein the output frequency is at least twice the input frequency, to drive a load coupled to the common output transmission line.

2. The system as set forth in claim 1, wherein the phased signals are at least one of the following: quadrature signals at half frequency of the output signal or differential quadrature signals at half frequency of the output signal.

3. The system as set forth in claim 1, wherein the signal generator is a hybrid coupler.

4. The system as set forth in claim 1, further comprising pre-driver stages provided to the distributed doubler core, each pre-driver stage being tuned to a different center frequency.

5. The system as set forth in claim 1, wherein the system further comprises a plurality of pre-driver stages, each pre-driver stage corresponding to one of the plurality of unified doubler cores and being tuned to a different center frequency.

6. The system as set forth in claim 1, wherein the system is implemented in a front-end for a near-THz multiple input, multiple output radar system.

7. A method comprising:
    producing phased signals at an input frequency by a signal generator;

receiving the phased signals at a plurality of unified doubler cores of a distributed doubler core, the plurality of unified doubler cores being coupled to a common output transmission line;

processing, by the plurality of unified doubler cores, the phased signals to produce, using complimentary bias control signals, a phase-coded output signal at an output frequency, wherein the output frequency is at least twice the input frequency; and, outputting, by the plurality of unified doubler cores, the output signal on the common output transmission line.

8. The method as set forth in claim 7, wherein the phased signals are at least one of the following: quadrature signals at half frequency of the output signal or differential quadrature signals at half frequency of the output signal.

9. The method as set forth in claim 7, wherein the signal generator is a hybrid coupler.

10. The method as set forth in claim 7, wherein at least one of the following: pre-driver stages are provided to the distributed doubler core, each pre-driver stage being tuned to a different center frequency, or the distributed doubler core comprises a plurality of unified doubler cores, or a plurality of pre-driver stages are provided to the distributed doubler core, each pre-driver stage corresponding to one of the plurality of doubler cores and being tuned to a different center frequency.

11. The method as set forth in claim 7, wherein the method is implemented in a front-end for a near-THz multiple input, multiple output radar system.

12. A system comprising:
an input line configured to provide input signals for power generation;
a common output transmission line;
a power splitter configured to receive the input signals and enable power combining on the output line; and,
a distributed doubler core comprising a plurality of unified doubler cores coupled to the common output transmission line and configured to generate and output, using complimentary bias signals, on the common output transmission line a single-ended output signal based on the input signals.

13. The system as set forth in claim 12, further comprising pre-driver stages provided to the distributed doubler core, each pre-driver stage being tuned to a different center frequency.

* * * * *